United States Patent Office 3,460,592
Patented Aug. 12, 1969

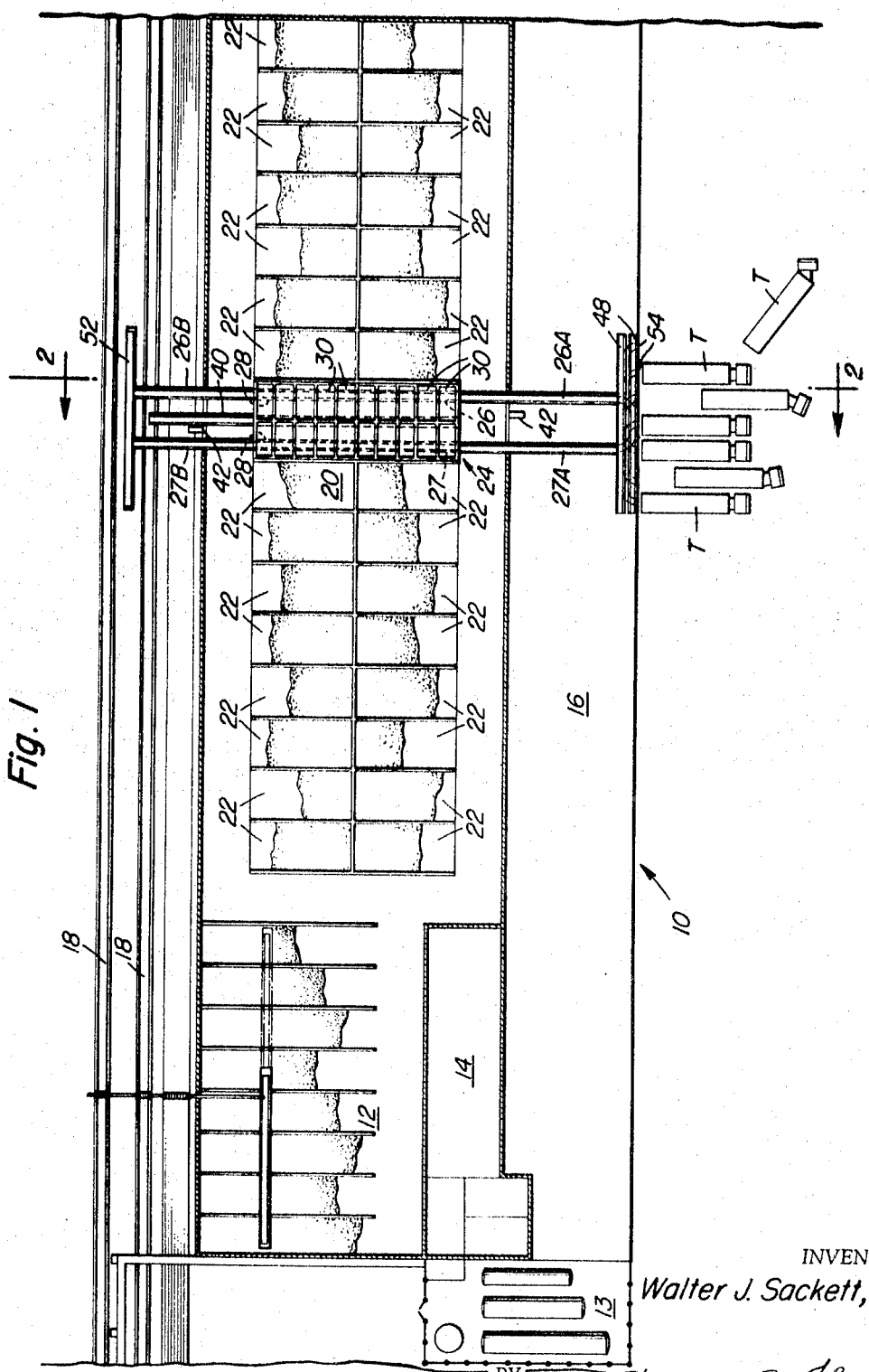

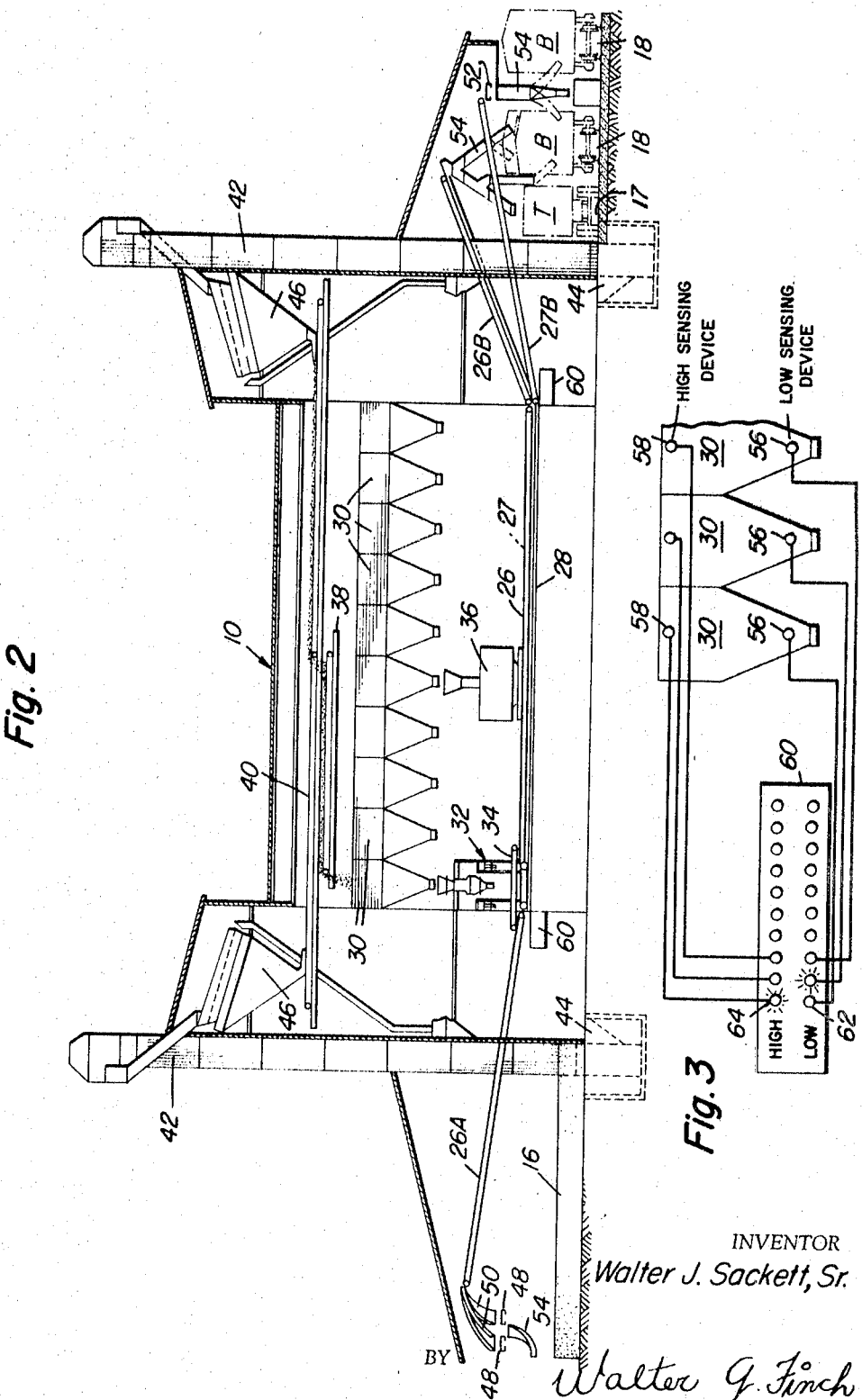

3,460,592
MULTI-PACKAGING, LOADING CONTROL SYSTEM FOR BOTH BULK AND PACKAGED MATERIALS
Walter J. Sackett, Sr., Baltimore, Md., assignor to The A. J. Sackett & Sons Company, Baltimore, Md., a corporation of Maryland
Filed Sept. 23, 1965, Ser. No. 489,573
Int. Cl. B65b 1/04; B67c 3/02
U.S. Cl. 141—98                                6 Claims

ABSTRACT OF THE DISCLOSURE

A plurality of hoppers are provided in a line, with a pair of tracks arranged beneath and along the line of the hoppers. A hopper is mounted to ride along one of the tracks, and a bag packer is mounted to ride along the other track, with each hopper being valved and gated to deliver granular material to either the bag packer or the hopper.

---

This invention relates generally to plant systems, and more particularly it pertains to an arrangement for handling classified granular materials, selecting large or small quantities and delivering them bagged or in bulk to carriers at a shipping dock.

A primary object of this invention is to provide a plant layout for the efficient handling of the output of such industrial concerns as chemical fertilizer manufacturers.

Another object of the invention is to provide a centralized arrangement of material handling elements whereby the dispensing of diversified granular material for shipment can be supervised at a minimum of control points.

Another object of this invention is to provide a multi-packaging, loading control ssytem for both bulk and packaged materials which is economical and efficient in operational use, easy to construct and maintain, and which is compact in meeting space requirements.

These and other objects and attendant advantages of this invention will become more obvious and understood from the following detailed description and accompanying drawings in which:

FIG. 1 is a plan view of a chemical fertilizer plant incorporating features of this invention;

FIG. 2 is a somewhat enlarged sectional view showing the shipping area taken on line 2—2 of FIG. 1; and FIG. 3 is an enlarged fragmentary detail view showing the hopper monitor arrangement.

Referring now to the details of the drawings as shown in FIG. 1, reference numeral 10 indicates generally a manufacturing plant for the production of a plurality of granular materials. This plant 10 is divided into three major areas, a raw materials storage area 12, a compounding area 14 and a product storage and shipping area 20. Exterior to the plant proper there is also a tank farm 13 wherein liquid raw materials such as acid and bases are stored.

The product resulting from the combining of such plurality of raw materials in the compounding area 14 is diversified and it is necessary to segregate it product-from-product in bins 22 in the area 20. Deliveries of product are made to both trucks and railway cars and for this reason a truck dock 16 is arranged on one side of the plant 10 and a truck road 17 and railway siding 18 on the opposite side.

The bins 22 of the shipping area 20 are divided into two generally equal groups separated by a dispensing area 24. This area 24 is narrow and compact and extends transversely across the plant 10. The area 24 has a pair of spaced conveyor belts 26, 27 on each side of double tracks 28 all extending parallel with the area 24 for its entire length.

A row of hoppers 30 is mounted high above the belts 26, 27 and tracks 28 and parallel therewith as best shown in FIG. 2.

A bag packer 32 is mounted on wheels and runs on one track 28 between the conveyor belts 26 under the hoppers 30. This bag packer 32 incorporates a short length conveyor belt 34 of the closing type for accumulating filled bags before delivering them in groups to the conveyor belt 26.

A bulk-feeding hopper 36 for handling the product in bulk form is positionable under the hoppers 30. It rides on the second pair of the tracks 28 and supplies the belt 27. The hoppers 30 are valved and gated to deliver to either the bag packer 32 or the bulk-feeding hopper 36.

The overhead hoppers 30 are charged with product from a reversible traveling conveyor 38 which is served by a fixed reversible conveyor 40. Both conveyors 38 and 40 operate on a line directly over the line of hoppers 30.

A pair of elevators 42, one at each end of the line of hoppers 30, elevates the product selected from the bins 20 by scoop truck and deposited in their boots 44. The product is screened by classifiers 46 before being deposited on the uppermost or fixed conveyor 40.

The conveyor belts 26 and 27 are reversible and thus can deliver bagged or bulk product in either direction to conveyor extensions 26A, 26B or 27A or 27B. Reversible bag shuttle conveyors 48 extend across the terminal ends of the conveyor extensions 26A and 27A and are fed therefrom by directable chutes 50. A similar reversible bag shuttle conveyor 52 is positioned across the terminal end of conveyor belt 27B. Gravity chutes 54 direct the product thence to ultimate disposition in trucks T or boxcars B.

When the content of a hopper 30 is nearly exhausted, a sensing device 56 mounted low on the hopper is actuated as indicated in FIG. 3. Conversely, when the hopper 30 is about to overflow a high mounted device 58 is actuated. A monitor panel 60 located within view of the operator of the dispensing area 24 and connected to these sensing devices 56, 58 lights appropriate lights 62 or 64 to advise him of the instant condition of each hopper 30.

What is claimed is:
1. A system for handling granular material, comprising a plurality of hoppers for receiving said granular material and each having an outlet for said granular material, conveyor means passing beneath said hoppers, track means paralleling said conveyor means, hopper means mounted to ride along said track means for directing granular material flowing from said hoppers onto said conveyor means, other track means paralleling said conveyor means, bag packer means mounted to ride along said other track means, and means for selectively discharging the flow of said granular material from the outlet of each of said hoppers.

2. The system for handling granular material of claim 1 wherein said plurality of hoppers are arranged in a linear path, storage means for said granular material are positioned on each side of said linear path, and means are provided for transferring said granular material from said storage means to said hoppers.

3. The system for handling granular material of claim 1 wherein said bag packer means includes a conveyor for storing packed bags of said granular material.

4. The system for handling granular material of claim 1 and additionally, a control panel including means indicating the presence of granular material at predetermined levels in said hoppers.

5. A storage arrangement and handling system for granular materials, comprising a plurality of hoppers arranged in a linear path for receiving granular material, each said hoppers having an outlet, storage means for said granular material positioned on each side of said linear path, means for transferring said granular material from said storage means to said hoppers, conveyor means passing beneath said hoppers and along said linear path, track means paralleling said conveyor means, hopper means mounted to ride along said track means for directing granular material flowing from said hoppers onto said conveyor means, other track means paralleling said conveyor means, bag packer means mounted to ride along said other track means, means for selectively discharging the flow of granular material from the outlet of each said hoppers, with said conveyor means being reversible in direction for delivering granular material received by it to either end of said linear path, and means at each said end of said linear path for receiving said granular material from said conveyor means and conveying it to another location.

6. The storage arrangement and handling system for granular material of claim 5 wherein a loading dock is positioned at one end of said linear path and a railroad siding is positioned at the opposite end of said linear path.

References Cited

UNITED STATES PATENTS

| | | | |
|---|---|---|---|
| 645,946 | 3/1900 | Evans. | |
| 1,321,025 | 11/1919 | Frazier | 214—16 X |
| 1,726,603 | 9/1929 | Allen | 214—16 |
| 2,781,799 | 2/1957 | Bradford | 141—68 |
| 2,851,401 | 9/1958 | Payne | 302—63 X |
| 2,853,105 | 9/1958 | Brown | 141—10 X |

LAVERNE D. GEIGER, Primary Examiner

EDWARD J. EARLS, Assistant Examiner

U.S. Cl. X.R.

141—232; 214—16